US012056632B2

(12) United States Patent
Malinofsky et al.

(10) Patent No.: US 12,056,632 B2
(45) Date of Patent: *Aug. 6, 2024

(54) SYSTEMS AND METHODS FOR INTERACTIONS BETWEEN TICKET HOLDERS AND SELF SERVICE FUNCTIONS

(71) Applicant: SITA B.V., Rotterdam (NL)

(72) Inventors: Andrew E. Malinofsky, Atlanta, GA (US); Reinout Vander Meulen, The Hague (NL); Bart René Yvonne Houlleberghs, Gravenhage (NL); Rico Andreas Barandun, Geneva (CH)

(73) Assignee: SITA B.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,007

(22) Filed: Aug. 21, 2023

(65) Prior Publication Data

US 2023/0394383 A1   Dec. 7, 2023

Related U.S. Application Data

(63) Continuation of application No. 17/876,697, filed on Jul. 29, 2022, now Pat. No. 11,769,083, which is a
(Continued)

(51) Int. Cl.
*G06Q 10/02* (2012.01)
*B64F 1/36* (2017.01)
(Continued)

(52) U.S. Cl.
CPC ............ *G06Q 10/02* (2013.01); *B64F 1/366* (2013.01); *H04W 4/021* (2013.01); *H04W 4/023* (2013.01); *H04W 4/029* (2018.02); *H04W 4/80* (2018.02)

(58) Field of Classification Search
CPC .................. G06Q 10/02–10/025; B64F 1/366
See application file for complete search history.

(56) References Cited

U.S. PATENT DOCUMENTS

| 5,748,850 A | 5/1998 | Sakurai |
| 5,793,639 A | 8/1998 | Yamazaki |

(Continued)

FOREIGN PATENT DOCUMENTS

| CN | 101131765 A | 2/2008 |
| CN | 101661641 A | 3/2010 |

(Continued)

OTHER PUBLICATIONS

Alghadeir, et al., Smart Airport Architecture Using Internet of Things, International Journal of Innovative Research in Computer Science & Technology (IJIRCST), ISSN: 2347-5552, vol. 4, No. 5, Sep. 2016, pp. 148-155 (Year: 2016).*

(Continued)

*Primary Examiner* — Daniel Vetter
(74) *Attorney, Agent, or Firm* — Morris, Manning & Martin, LLP; Daniel E. Sineway, Esq.; Adam J. Thompson, Esq.

(57) ABSTRACT

Systems and methods are described for facilitating interaction between a ticket holder and a self-service function related to a ticket. Using a mobile device, a machine-readable code is scanned associated with the self-service function to retrieve an identifier of the self-service function and to activate an application or a web session on the mobile device. A first connection session can be established between the mobile device and a cloud broker service. A second connection session can be established between the self-service function and the cloud broker service. The cloud broker service can generate an end to end session via the first connection session and the second connection session by mapping an identifier of the mobile device with the identifier (Continued)

of the self-service function. The self-service function can communicate through the cloud broker service to the application of the mobile device.

18 Claims, 10 Drawing Sheets

Related U.S. Application Data continuation of application No. 15/803,177, filed on Nov. 3, 2017, now Pat. No. 11,410,088.

(51) Int. Cl.
*H04W 4/02* (2018.01)
*H04W 4/021* (2018.01)
*H04W 4/029* (2018.01)
*H04W 4/80* (2018.01)

(56) References Cited

U.S. PATENT DOCUMENTS

| | | |
|---|---|---|
| 5,897,620 A | 4/1999 | Walker et al. |
| 6,044,353 A | 3/2000 | Pugliese, III |
| 6,259,405 B1 | 7/2001 | Stewart et al. |
| 6,414,635 B1 | 7/2002 | Stewart et al. |
| 6,553,336 B1 | 4/2003 | Johnson et al. |
| 6,735,630 B1 | 5/2004 | Gelvin et al. |
| 6,736,322 B2 | 5/2004 | Gobburu et al. |
| 6,758,394 B2 | 7/2004 | Maskatiya et al. |
| 6,972,682 B2 | 12/2005 | Lareau et al. |
| 7,027,808 B2 | 4/2006 | Wesby |
| 7,231,355 B2 | 6/2007 | Schoen et al. |
| 7,275,689 B2 | 10/2007 | Mak |
| 7,486,171 B2 | 2/2009 | Kim et al. |
| 7,599,847 B2 | 10/2009 | Block et al. |
| 8,120,467 B2 | 2/2012 | Ehrman et al. |
| 8,215,546 B2 | 7/2012 | Lin et al. |
| 8,229,458 B2 | 7/2012 | Busch |
| 8,467,726 B2 | 6/2013 | Shirakata et al. |
| 8,509,441 B2 | 8/2013 | Yoon et al. |
| 8,521,681 B2 | 8/2013 | Ouchi et al. |
| 8,631,358 B2 | 1/2014 | Louch |
| 8,665,238 B1 | 3/2014 | Gossweiler, III et al. |
| 8,847,754 B2 | 9/2014 | Buchheim et al. |
| 8,892,132 B2 | 11/2014 | Monks et al. |
| 8,949,142 B1 | 2/2015 | Angrish et al. |
| 8,977,568 B1 | 3/2015 | Schattauer et al. |
| 9,024,752 B2 | 5/2015 | Tumayan et al. |
| 9,026,461 B2 | 5/2015 | Calman et al. |
| 9,047,512 B2 | 6/2015 | Otis et al. |
| 9,097,788 B1 | 8/2015 | Humphrey et al. |
| 9,134,955 B2 | 9/2015 | Healey et al. |
| 9,141,325 B2 | 9/2015 | Dersy et al. |
| 9,239,246 B2 | 1/2016 | Jones |
| 9,275,550 B1 | 3/2016 | Stefani et al. |
| 9,541,632 B2 | 1/2017 | Frank et al. |
| 9,544,075 B2 | 1/2017 | Altman et al. |
| 9,552,564 B1 | 1/2017 | Martenis |
| 9,589,262 B2 | 3/2017 | Graylin et al. |
| 9,589,405 B2 | 3/2017 | Cabouli et al. |
| 9,599,989 B1 | 3/2017 | Brown |
| 9,641,969 B2 | 5/2017 | Theurer et al. |
| 9,710,920 B2 | 7/2017 | Utsunomiya et al. |
| 9,749,831 B2 | 8/2017 | Lee et al. |
| 9,886,716 B2 | 2/2018 | Salvatore |
| 10,554,507 B1 | 2/2020 | Siddiqui et al. |
| 2005/0258230 A1 | 11/2005 | Wiater |
| 2006/0015503 A1 | 1/2006 | Simons et al. |
| 2006/0208891 A1 | 9/2006 | Ehrman et al. |
| 2009/0266882 A1 | 10/2009 | Sajkowsky |
| 2010/0078475 A1 | 4/2010 | Lin et al. |
| 2011/0077085 A1 | 3/2011 | Finn et al. |
| 2011/0231212 A1 | 9/2011 | Hurley et al. |
| 2012/0041313 A1 | 2/2012 | Tanaka et al. |
| 2012/0105197 A1 | 5/2012 | Kobres |
| 2012/0322379 A1 | 12/2012 | Eun et al. |
| 2013/0066770 A1 | 3/2013 | Das et al. |
| 2013/0290089 A1 | 10/2013 | Bousbib et al. |
| 2014/0223043 A1 | 8/2014 | Dersy et al. |
| 2015/0095254 A1 | 4/2015 | Naber et al. |
| 2015/0286959 A1 | 10/2015 | Hauviller et al. |
| 2016/0026937 A1 | 1/2016 | Gormley |
| 2016/0035053 A1 | 2/2016 | Gerhardt |
| 2016/0152350 A1 | 6/2016 | Puentes et al. |
| 2016/0180255 A1 | 6/2016 | Goedemondt |
| 2016/0253599 A1 | 9/2016 | Lang et al. |
| 2017/0004444 A1 | 1/2017 | Krasko et al. |
| 2017/0032263 A1 | 2/2017 | Yuan et al. |
| 2017/0055157 A1 | 2/2017 | Bergdale et al. |
| 2018/0033002 A1 | 2/2018 | Weiss et al. |
| 2018/0068315 A1 | 3/2018 | Bergdale et al. |
| 2018/0218463 A1 | 8/2018 | Jobling |
| 2018/0315258 A1 | 11/2018 | Moghe et al. |
| 2019/0147558 A1 | 5/2019 | Cheikh et al. |
| 2021/0118019 A1 | 4/2021 | Aroli Veettil |

FOREIGN PATENT DOCUMENTS

| | | |
|---|---|---|
| CN | 106097513 A | 11/2016 |
| CN | 106127964 A | 11/2016 |
| CN | 106327121 A | 1/2017 |
| DE | 102009020228 A1 | 11/2010 |
| DE | 102014005699 A1 | 10/2015 |
| EP | 1308864 A1 | 5/2003 |
| EP | 0770546 B1 | 12/2003 |
| EP | 2932902 B1 | 12/2016 |
| EP | 1872294 B1 | 11/2017 |
| EP | 2151797 B1 | 1/2019 |
| IN | 372017 | 9/2017 |
| JP | 2003157984 A | 5/2003 |
| JP | 2017129981 A | 7/2017 |
| KR | 100798741 B1 | 1/2008 |
| KR | 101757529 B1 | 7/2017 |
| RU | 2615319 C2 | 4/2017 |
| RU | 2616492 C2 | 4/2017 |
| WO | 2013117723 A1 | 8/2013 |
| WO | 2015192895 A1 | 12/2015 |

OTHER PUBLICATIONS

Albuquerque A., et al., "Baggage Tracking System," Oct. 30, 2009, Accessed on Apr. 21, 2022, 10 Pages, Retrieved from URL: https://fenix.tecnico.ulisboa.pt/downloadFile/395139412938/PaperAndreAlbuquerque_en.pdf.
Examination Report issued in Chinese Application No. 201880080711.0, mailed Dec. 29, 2021, 17 Pages.
IATA: "Baggage Tracking," IATA Resolution 753/A4A Resolution 30.53, Implementation Guide, Airlines for America, Nov. 13, 2017, Issue 3.0, 85 Pages.
"Intelligent Baggage Management and Tracking," BMRS, Jun. 12, 2019, 1 Page.
International Preliminary Report on Patentability for International Application No. PCT/EP2018/080053, mailed May 14, 2020, 10 Pages.
International Search Report and Written Opinion for International Application No. PCT/EP2018/080053, mailed Feb. 1, 2019, 16 Pages.
Jaffer S., et al., "Digital Strategy in Airports, " 25th Australasian Conference on Information Systems, Dec. 8-10, 2014, 12 Pages.
Koren I., et al., "Session Mobility for Collaborative Pervasive Apps Using XMPP," IEEE Workshop on Pervasive Collaboration and Social Networking, Mar. 18, 2013, pp. 169-174.
Kumar S., "Indoor Positioning Systems—Transforming the Location-Based Application Landscape," Interblog Technologies: Oct. 22, 2018, 10 Pages, Retrieved from URL: https://www.interglobetechnologies.com/blog/indoor-positioning-systems-transforming-the-location-based-application-landscape/downloaded.
Mallik N., "How Airlines Can Use Beacons to Enhance Travel Experience," Blog BeaconStac: Retreived from URL: https://blog.

(56) References Cited

OTHER PUBLICATIONS beaconstac.com/2014/07/how-airlines-can-use-beacons-to-enhance-travel-experience/, downloaded Oct. 22, 2018; Published Jul. 23, 2014, 11 Pages.

Mobile & Wearables: SITA Lab : Beacon Technology can Personalise Airport Experience but Common Use Approach is Needed, Mar. 2014, downloaded Oct. 22, 2018, 3 Pages, Retreived from ULR: https://www.futuretravelexperience.com/2014/03/sita-lab-beacon-technology-can-personalise-airport-experience-common-use-approach-needed.

Romano A., "American's New Baggage Tracking App Will Tell You Where Your Stuff Is at All Times," Jul. 31, 2017, 2 Pages.

Search Report for Russian Application No. 2020117781/07, dated Apr. 28, 2022, 2 Pages.

SITA: "Connecting To Passengers—Are Beacons The Breakthrough," SITA, Create Success Together, Mar. 14, 2014, pp. 1-4, XP055545937, [Retrieved on Jan. 22, 2019] Retrieved from URL: http://www.futuretravelexperience.com/wp-content/uploads/2014/03/insight-paper-beacons.pdf.

Vincent J., "Delta's New App Lets You Track Your Bag From Airplane To Airport," The Verge, Oct. 26, 2016, 4 Pages.

\* cited by examiner

SYSTEMS AND METHODS FOR INTERACTIONS BETWEEN TICKET HOLDERS AND SELF SERVICE FUNCTIONS

CROSS REFERENCE TO RELATED APPLICATIONS

This application is a continuation of U.S. application Ser. No. 17/876,697, filed Jul. 29, 2022 and entitled "SYSTEMS AND METHODS FOR INTERACTIONS BETWEEN TICKET HOLDERS AND SELF SERVICE FUNCTIONS," which is a continuation of U.S. application Ser. No. 15/803,177, now U.S. Pat. No. 11,410,088, filed Nov. 3, 2017 and entitled "SYSTEMS AND METHODS FOR INTERACTIONS BETWEEN TICKET HOLDERS AND SELF SERVICE FUNCTIONS," which are each hereby incorporated by reference in their entireties.

This invention relates to automated interactions with passenger services such as baggage handling. In particular, but not exclusively, it is concerned with the handling of baggage at airports, seaports, railways, other mass transport locations, venues, stadiums and arenas.

In the airport environment, checking-in of baggage can be a time consuming and stressful experience for passengers. At busy times long queues can form caused partly by the slow, manned check-in process which includes ground staff printing bag tags for each item of baggage and fixing those tags to the baggage item.

The baggage check-in process represents a high cost overhead to airports and airlines due to ongoing operational and maintenance costs of the bag tagging equipment together with staff costs associated with the check-in process and maintenance.

In recent years some steps have been taken to reduce these costs and to streamline the check-in process and reduce queueing times for passengers. For example many airlines now provide on-line check-in services which require passengers only to drop their bags when they arrive at the airport. More recently some airlines have introduced semi-automated self-service bag drops where a bag tag is generated from a scan of a boarding pass and affixed by the passenger. Some airlines have adopted a hybrid approach using a combined self-service and ground staff assisted facility. Although these measures have gone some way to alleviate the problems discussed above they all require some sort of interaction between a passenger and a ground agent, kiosk or other computerised equipment. These solutions themselves generate further problems as they require significant modifications to the check-in counters at airports and considerable investment in the self-service equipment. Both of these are costly and operationally complex.

In addition to the above issues there is an increasing awareness of the needs of disabled passengers. Many countries have legislated to ensure that disabled and reduce mobility passengers are adequately supported at airports. An example is EU regulation 1107/2006 which identifies the check-in and baggage registration and drop off processes as areas where the airport is responsible for the provision of assistance to disabled or reduced mobility passengers. Existing or future legislation requires access to any automated or self-service bag drop solution and may require, for example, specified maximum height of touch access for wheelchair access and specified additional control devices for visually impaired passengers.

The invention aims to address and to ameliorate these problems.

According to one aspect of the invention there is provided a method of facilitating interaction between a ticket holder and a self-service function related to the ticket, comprising the steps of: detecting by a mobile device proximity to a self-service function, the mobile device having stored thereon information relating to the ticket and the self-service function being related to the ticket; on detection by the mobile device of proximity to the location, activating an application on the mobile device, the application being related to the self-service function; and communicating to the mobile device via the application, information about the self-service function including directional information.

The invention also provides a system for facilitating interaction between a ticket holder and a self-service function related to the ticket, comprising: a self-service function; a mobile device, the mobile device having stored thereon information relating to the ticket; at least geolocation device; wherein the mobile device is configured to detect the geolocation device at a location proximate a self-service function, and at least one server having stored thereon computer software for performing the steps of: on detection by the mobile device of the geolocation device proximate the location, activating an application on the mobile device, the application being related to the self-service function; and communicating to the mobile device via the application, information about the self-service function including directional information.

A second aspect of the invention provides a method of facilitating interaction between a ticket holder and a self-service function related to the ticket, comprising the steps of: at a location proximate a self-service function related to the ticket activating an application on the mobile device, the application being related to the self-service function and the mobile device having stored thereon information relating to the ticket; and communicating to the mobile device via the application, information about the self-service function including directional information.

Embodiments of the invention may have the advantage of simplifying interaction between ticket holders and self service functions. In one preferred embodiment the self-service function is a bag drop system, for example for use in an airport. Embodiments of the invention may have the advantage of making interactions with the bag drop more simple, and enabling airline or other service providers to reduce the amount of human interaction required in the bag drop, and other self-service processes and so reduce cost and overheads.

In one embodiment of the invention the ticket relates to a passenger journey and includes passenger and journey identification. The ticket information may comprise a boarding pass. In one embodiment the presence of the mobile device at the location may be detected using a geolocation device, for example a Bluetooth beacon.

In one embodiment the application queries ticket information stored on the mobile device and communicates the ticket information to a remote server. The remote server, in response to receipt of the ticket information provides information relating to the self-service function to the application for presentation to the user of the mobile device.

In one embodiment the self-service function is a bag drop and the information relating to the ticket is a boarding pass, passenger information in the boarding pass is communicated to a departure control system. The departure control system may determine whether baggage relating to the boarding pass is eligible for bag drop and communicates the eligibility to the mobile device.

In one embodiment of the invention, on deposit of a bag at a bag drop, the bag is weighed and a determination made as to whether the weight exceeds an allowable weight and, if the weight exceeds an allowable weight arrangements are made for payment of an excess baggage fee via the application.

In one embodiment a bag tag is printed at the bag drop and instructions for fixing the bag tag to a bag are communicated for presentation to the user to the mobile device via the application.

In one embodiment, on receipt of a bag by the bag drop, information about boarding and routing to a departure gate is communicated to the application.

Embodiments of the invention will now be described, by way of example only, and with reference to the accompanying drawings, in which.

Figure 7:
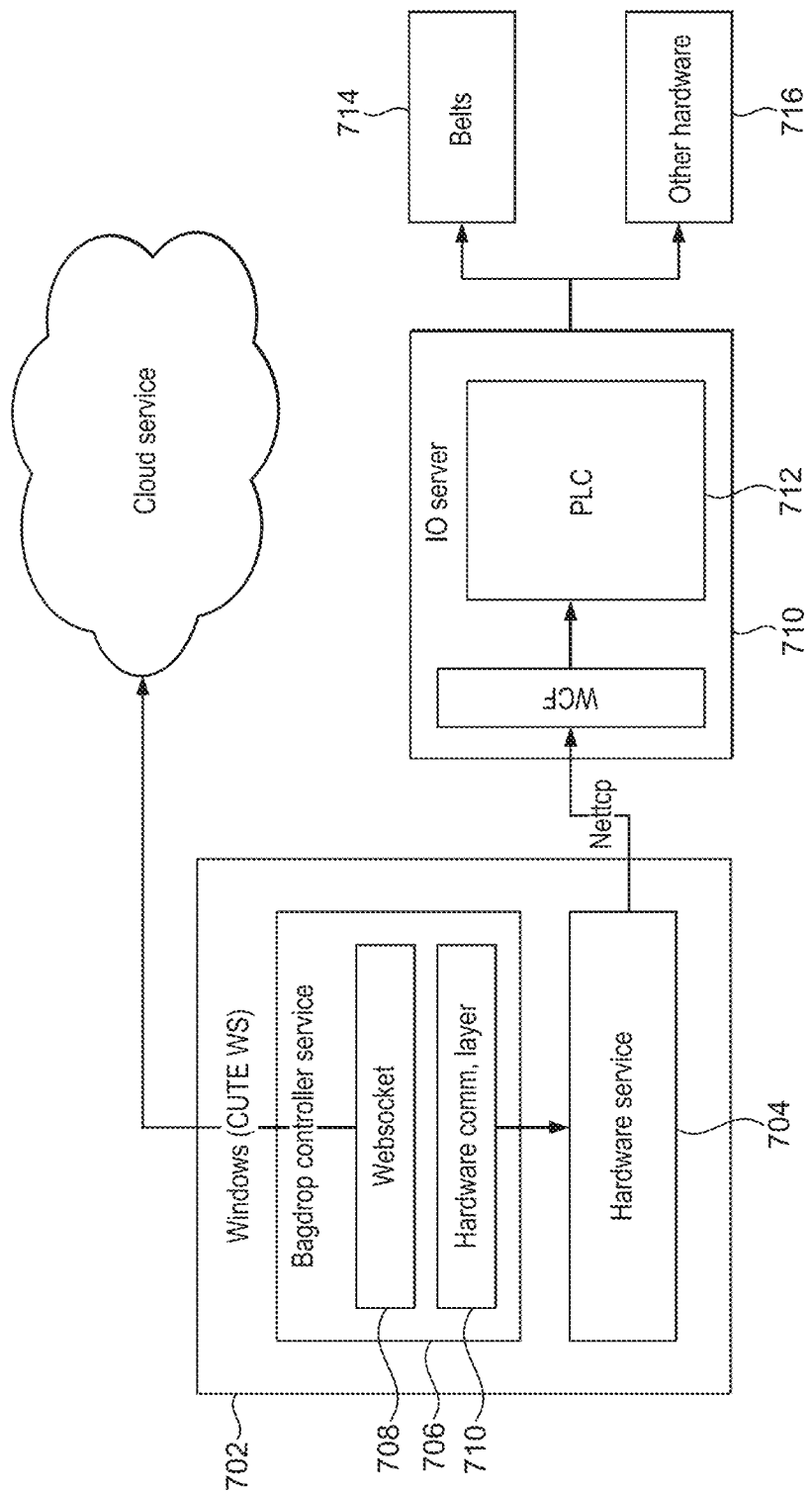
Figure 8:
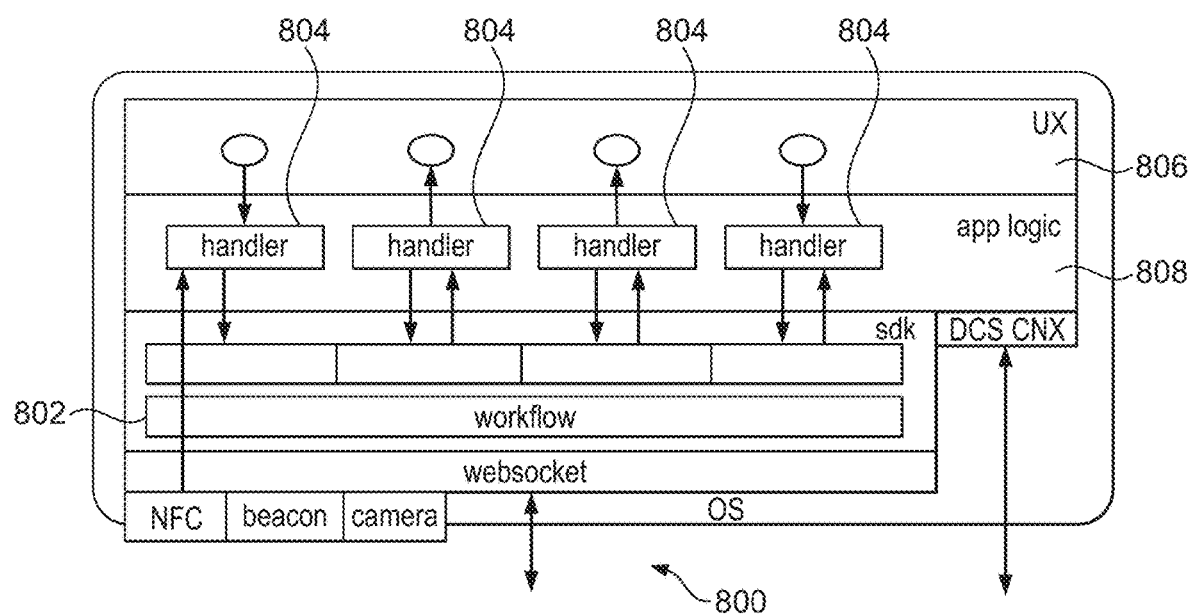
Figure 9:
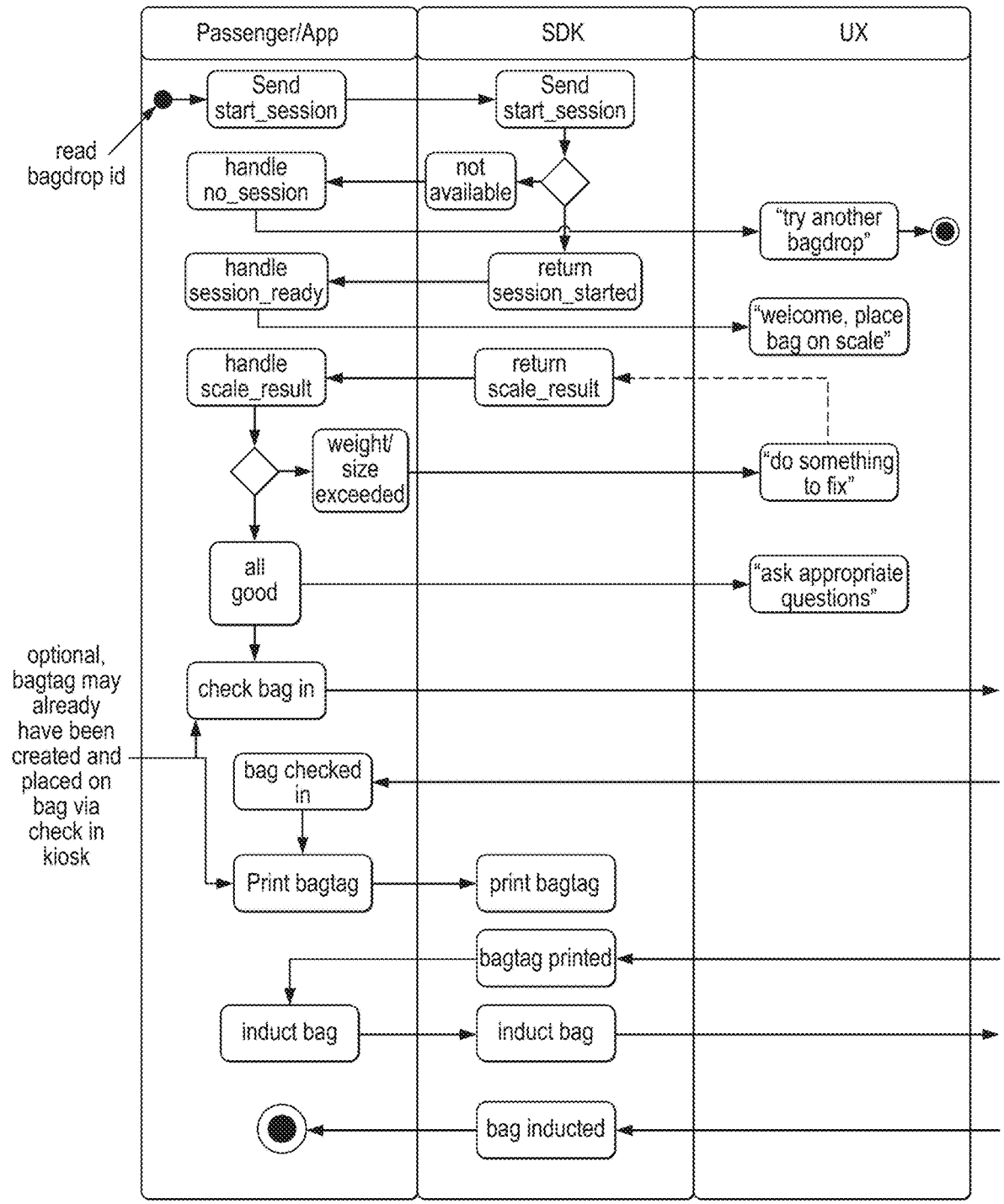

FIG. 7 schematically illustrates the Bag Unit Controller;

FIG. 8 illustrates the high level interactions occurring at the mobile device application;

FIG. 9 is a process flow diagram for the mobile app; and

Figure 10:
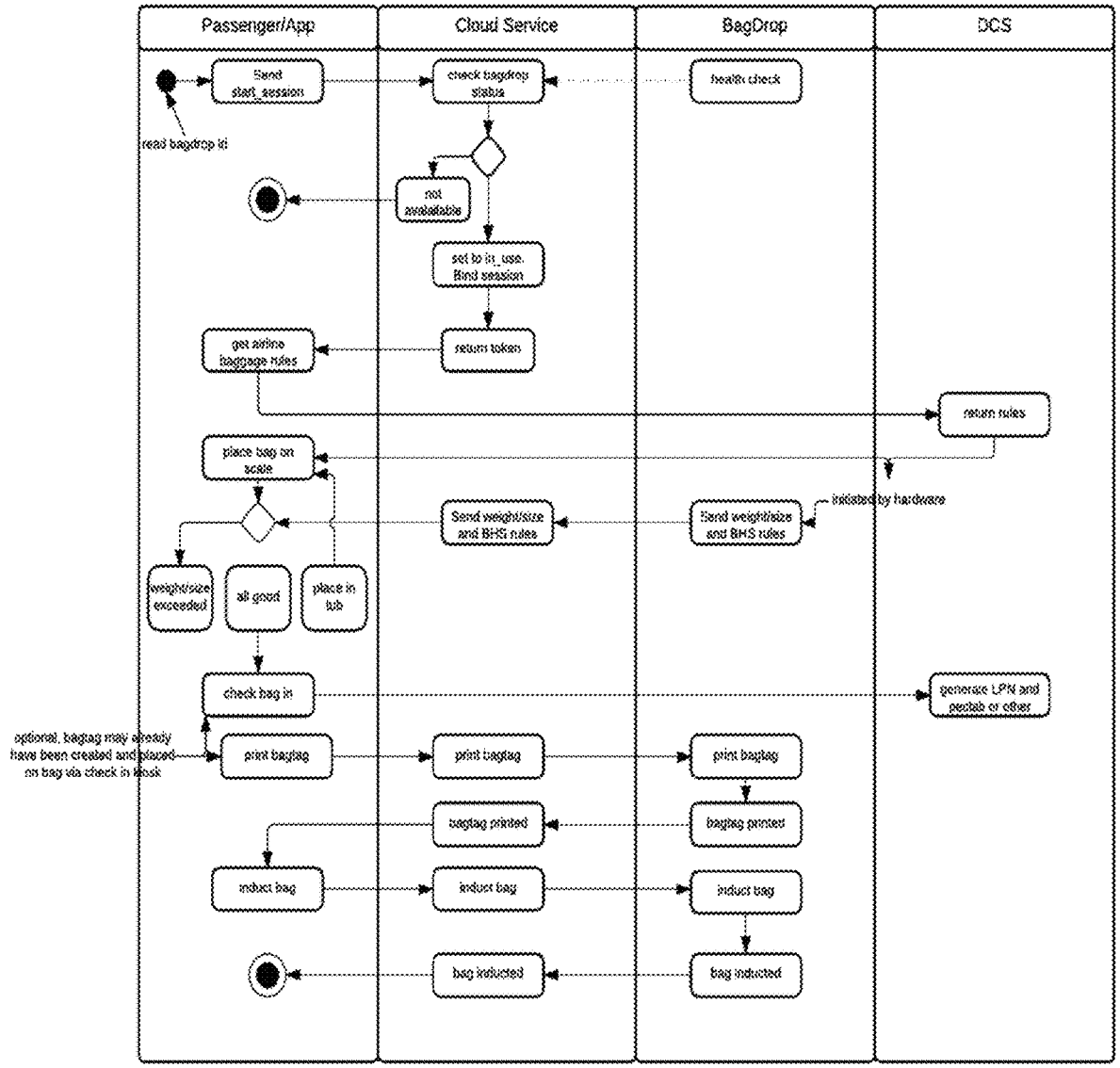

FIG. 10 is a process flow diagram for the overall system.

DESCRIPTION OF PREFERRED EMBODIMENTS

In the examples given below the bag drop sequence is initiated from a passenger smart phone, tablet, laptop or similar mobile computing device. Geo-location technology such as Bluetooth beacons or other location sensors are used to enable an app on a mobile device to detect when it is proximate a given beacon or other device. However, automatic location detection is not essential to the invention. Although described in relation to bag drop, embodiments of the invention may also be used in conjunction with other passenger interactions such as passenger processing kiosks for printing bag tags, boarding passes, scanning passports and other functions, interactions with mobile enabled payments via the passengers smartphone or other device, and interactions with other airport facilities including, but not limited to self-service checkpoints and gates, for example automated passport control gates or barriers. Embodiments are described with specific reference to airports but the invention has broader applicability to any travel environment in which a passenger is required to check-in or drop baggage and so includes sea ports and railways. Embodiments of the invention may also be used for mass ticketing events to assist in directing spectators and audiences, for example sporting venues and entertainments such as concerts and festivals.

In the embodiments shown in the Figures, which relate specifically to an airport solution, location technology such as Bluetooth beacons distributed around an airport is used to enable a passenger's mobile device such as a smart phone, tablet, laptop or other device to identify the presence of a given beacon. Any other indoor or outdoor geo-location technology may be used to enable the device to identify its relative location. However, as will become clear, although preferred, Bluetooth beacons or other location technology is not essential to the invention. The mobile device has a bag drop application which is downloaded by the passenger. This application may be a unique bag drop app or a bag drop module of an airline or airport app. The mobile device 10 detect the presence of the location devices, for example when it enters the airport and passes proximate to a first beacon 12. As the passenger passes through the airport toward the bag drop area, the second beacon 14 is detected by the device 10 which initiates the bag drop application on the device. The detection by the passenger's mobile device of the first beacon on entry to the airport is not essential but is advantageous as detection of beacons by the device enables interaction with other services that are provided in the airport.

The use of beacon detection to track the movement of a passenger through an airport or similar environment is described in WO2013117723.

Once the application has been initiated it either queries the passengers booking details from their mobile boarding pass stored on the phone, for example using Apple® wallet or similar apps, or, where there is no stored boarding pass, asks the passenger to scan their printed boarding pass either using their device's camera or a scanner provided at the bag drop.

Where a mobile boarding pass is stored on the device, the app will identify from the stored passenger related data whether or not the passenger has checked in a bag and, if so, how many. Where a bag has been checked in the app then causes instructions to be displayed to the passenger on how to proceed with the bag drop process. Where no check-in bag is detected, the app may give the passenger the option of amending their booking to permit check-in.

Where the interaction is with a different self-service function the process functions in a similar manner. For example where the function is self-service passport control the app, which is again a unique app or a module of an airline or airport app, detects the presence of the device in a passport check area and presents instructions to the user via the device display as to how to proceed and how to negotiate the passport scanner.

Thus, in one embodiment, the system uses a passenger Smartphone or other mobile device, and, optionally, any indoor or outdoor geo-location technology such as Bluetooth beacons or other types of sensors and mapping applications, to automate the Bag Drop process or any other passenger process which requires interaction with a system at an airport or other associated locations. When in the proximity of a Bag Drop area, a Passenger Processing kiosk or station, a checkpoint or e-gate, a mobile app on the passenger's Smartphone or other mobile device activates, and the passenger and their booking details are identified. The passenger device "pairs" with the Bag Drop unit and further instructions on how to manage the Bag Drop are all executed electronically/wirelessly via the Smartphone or mobile device. The system comprises a mobile application on, for example, a smartphone, a processing unit (controller) connected to the bag drop unit, and a cloud based API service which mediates, or "proxies" the interaction between the mobile application and the bag drop unit as is described in more detail below.

Although the embodiment described below uses Bluetooth as a trigger mechanism to pair a mobile device with the baggage system, other methods are possible. For example another type of automatic pairing such as another Near Field Communication (NFC), WIFI or BLE beacons could be used or a manual method such as a QR or another barcode which is scanned by the mobile device owner to launch the application, or a voice activation command such as Amazon Alexa™. Where barcodes are used the passenger may scan a 2-D barcode on a sticker at a check in desk or photograph the code in known manner. In order to address security concerns barcodes may be produced using e-ink and changed regularly. For the sake of clarity communications between the mobile device and the baggage handling system is via an API service as described below using WIFI or another communications protocol.

Figure 2:
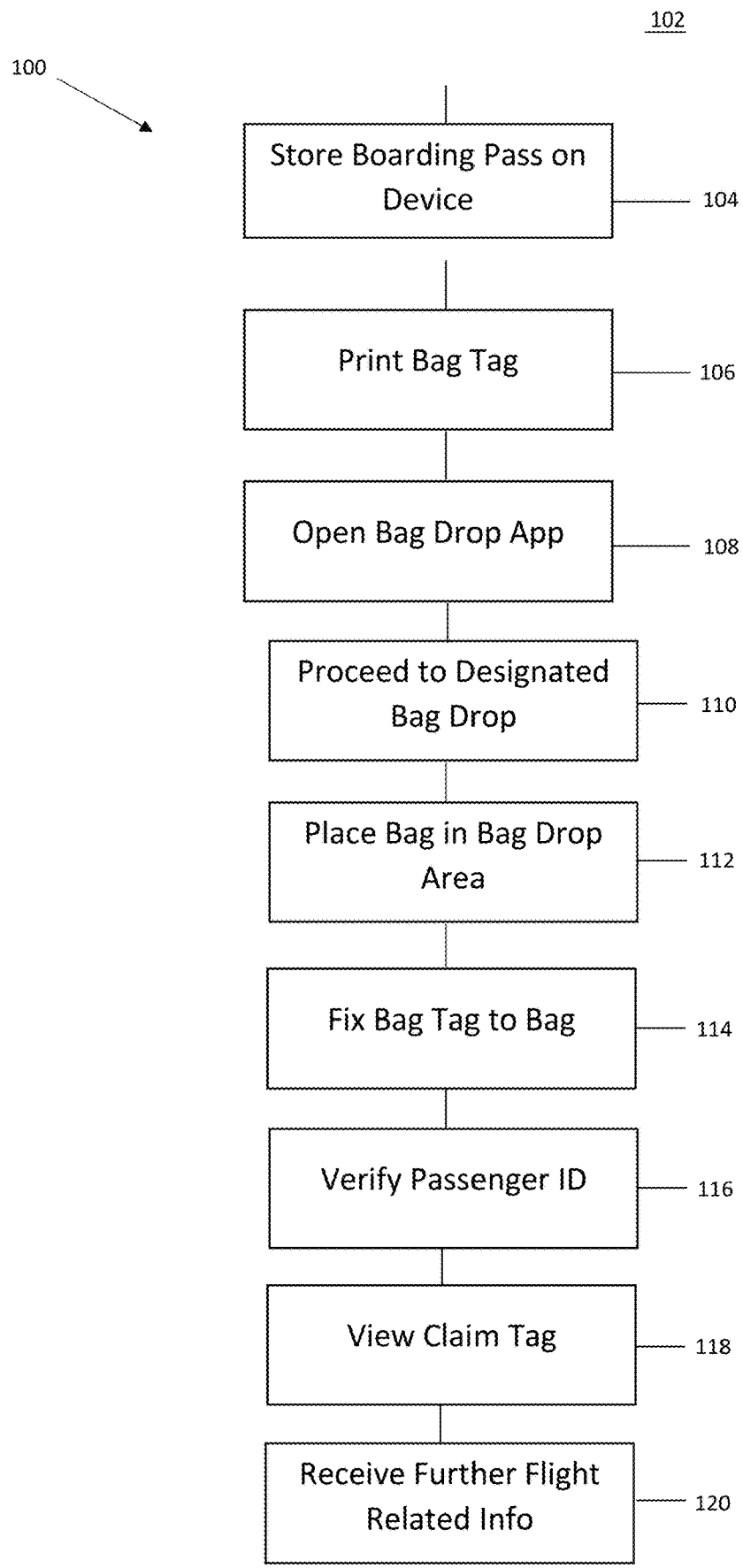
FIG. 2 is a flow chart illustrating the steps in an embodiment of the invention.

The process in relation to bag drop is shown in more detail in FIG. 2 which is presented from the perspective of the passenger. The process is shown generally at 100. At step 102 the passenger checks-in on-line via their smartphone or other mobile device. As mentioned above this could be via a specific application or via a check in module on the airlines website. As part of the check-in process a mobile boarding pass is created which includes various passenger information including passenger ID and baggage allowance. The boarding pass is stored in a suitable storage location on the mobile device. An example of a suitable storage location is the Apple wallet application on devices running Apple IOS or Google PassWallet on devices running Android. Other storage options are possible.

Each airline may decide between offering a two-stop self-bag drop process and a one-stop process. The example of FIG. 2 is a two-stop process in which, at step 106, the passenger prints a bag tag and affixes the tag to their baggage. This printing may take place in the user's home or office environment or at a kiosk in the airport. The kiosk may be dedicated to bag tag printing or provide other function such as on-line check in. In the one-stop process step 106 is omitted and the passenger proceeds straight to the bag drop.

Figure 1:
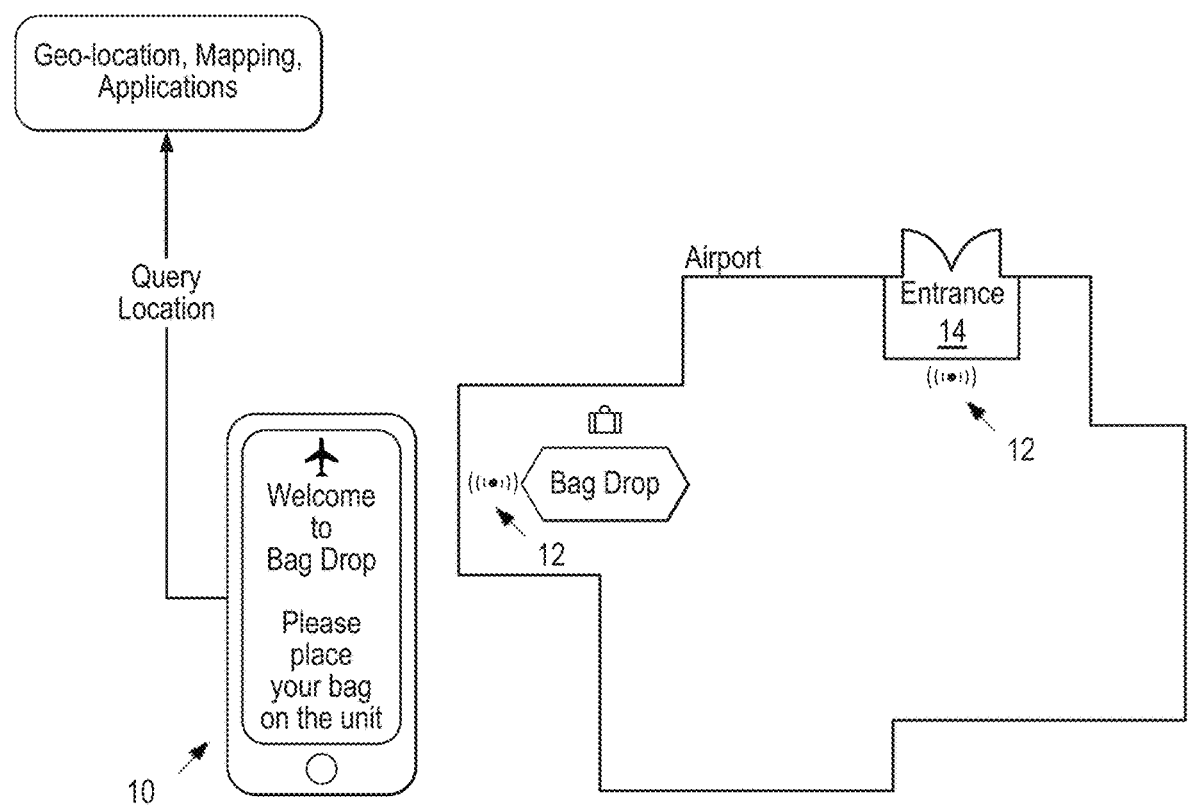
FIG. 1 is a schematic overview of an embodiment of the invention.

On entry into the airport the passenger's mobile device detects a beacon arranged near the airport entrance (12, FIG. 1). The mobile device detects again a second beacon when the passenger approaches that second beacon 14 on entry into a bag drop area of the airport. This detection causes a message to be sent between the user's mobile device by the airline or airport system asking them to open their app or sending them the URL of the airline bag drop module. The message may be sent by SMS, instant message or any other convenient messaging protocol. In an alternative embodiment, the respective app could be initiated automatically via the beacons either via a Bluetooth or other wireless connection.

As an alternative to messaging via passenger's smart device, the relevant portion of the airport may be provided with signage instructing passengers to open the bag-drop app or to visit the website. A QR code or other barcode could be provided which, when scanned with the device's camera would open the app or website automatically or initiate the bag-drop process if that app is already open. This option has the advantage to the airline that they know which self-bag drop (SBD) a given passenger is using as the barcodes may include an individual code that broadly corresponds to location within the airport. This assists the airline in monitoring usage and controlling passenger through flow.

In one preferred option, both messaging to passengers' devices and signage is used to improve reliability and to ensure that passengers can use the system, for example if they have forgotten to switch on Bluetooth.

In one embodiment the signage includes a braille instruction for blind or visually impaired passengers and the app may include voice instructions.

With the bag drop app opened the passenger proceeds to the designated bag drop at step 110. The app may instruct the passenger to present themselves to a particular one or group of self-bag drop terminals. At this stage, the bag drop application or module has retrieved boarding pass data that is stored on the device. This may include baggage allowance information or that information may be retrieved, using the passenger identification, from the airlines departure control system (DCS). An eligibility check may be performed, for example to determine whether the passenger is too early to drop their bags, or too late or whether the mobile device bag drop option is not available for their particular flight.

At step 112 the passenger presents themselves at the bag drop area and the application displays a message asking them to place their bag on the luggage belt or static scale. As with any conventional bag drop, the bag is weighed to check that it is within permitted allowances. The weight is communicated back to the app which can check the received weight against allowances that are either stored as part of the boarding card or can be retrieved from the DCS.

If the bag fails the weight check the passenger is asked to pay for the excess baggage. This may be via a credit or debit card already stored in the airline application or via a regular online transaction. The transaction is of the "card not present" type and will be unique to each airline, each of which have their own excess baggage fees.

Assuming that the weight is within permitted limits, or that an excess has been paid for, at step 114 a bag tag is now printed. In the case of the two-step process mentioned above this step is not necessary as the bag tag already exists. The app then displays to the passenger information regarding how to affix the bag tag to the bag.

Once the bag tag has been attached, the LPN (License Plate Number) barcode may be read via the device's camera. This is helpful where a bag does not arrive at the intended destination or where the passenger does not present themselves for the flight or a claim for compensation is made. In one embodiment a 3D scan of the bag may be performed to check that the bag is within permitted dimensions and is suitable and rigorously constructed to be conveyed.

At step 116 a passenger verification step is performed. As the app has access to the airline DCS, it can retrieve the PNR (passenger name record) and compare the data on the tag with that record. The app may instruct the passenger to take a selfie or use one or more other forms of verification offered by the mobile device such as biometric identification or finger print recognition. Data collected in this manner may be stored for later reference.

At step 118, if the identity of the passenger is verified, the bag is accepted by the departure control system (DCS) and a claim tag is shown to the passenger on the smart phone. This tag is stored in the application and/or on the mobile device. The bag is then handed over to the baggage handling system, this step being performed automatically or with the assistance of an airline agent.

With the bag now handed over, the app may supply the passenger with further information regarding their flight, such as, but not limited to, the boarding time and gate. At this point the app may automatically close or may return the passenger to a way finding application of the type disclosed in WO2013/117723 which directs the passenger to the departure gate using near field beacons distributed around the airport.

Figure 3:
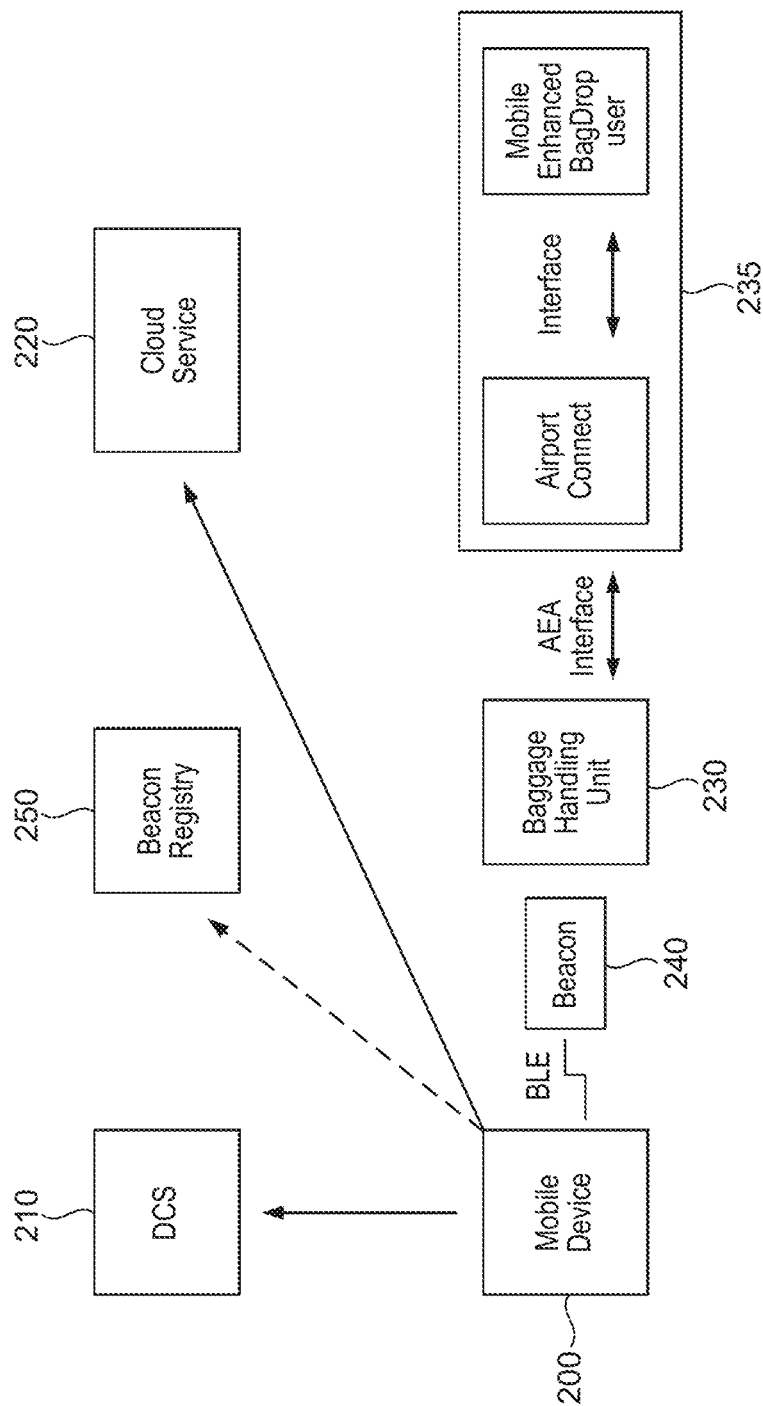
FIG. 3 shows an overview of a system embodying the invention.

FIG. 3 shows the essential hardware components used in the process described above. The Passengers mobile device is shown at 200 and is loaded with the app which consists of the logic to check a passenger's bag in. As mentioned above the app may be, for example, a module of an airline app or a standalone app. Device 200 communicates with the airline departure control system (DCS) 210 and a cloud service 220, which hosts a set of APIs and associated logic. A baggage check in system includes a baggage check in unit 230 and a controller 235 which may be either a hardware controller associated with the baggage check-in unit (BCIU) 230 which contains software and/or firmware to communicate with the BCIU 230, or a CUTE/CUSS module which does the same. CUTE (Common Use Terminal Equipment) and CUSS (Common Use Self Service). CUTE and CUSS are well known standards which enable hardware to be used by multiple airlines or service companies. Although not essential, a beacon 240 is provided for automatic identification of the bag drop area which communicates with the mobile device via Bluetooth™ or another communication protocol. Where beacons are used the mobile device 200 also communicates with a beacon registry 250 to retrieve a bag drop identifier. Even where beacons are used, the beacon registry 250 may not be essential as the service by be supported by the cloud service 220.

Figure 4:
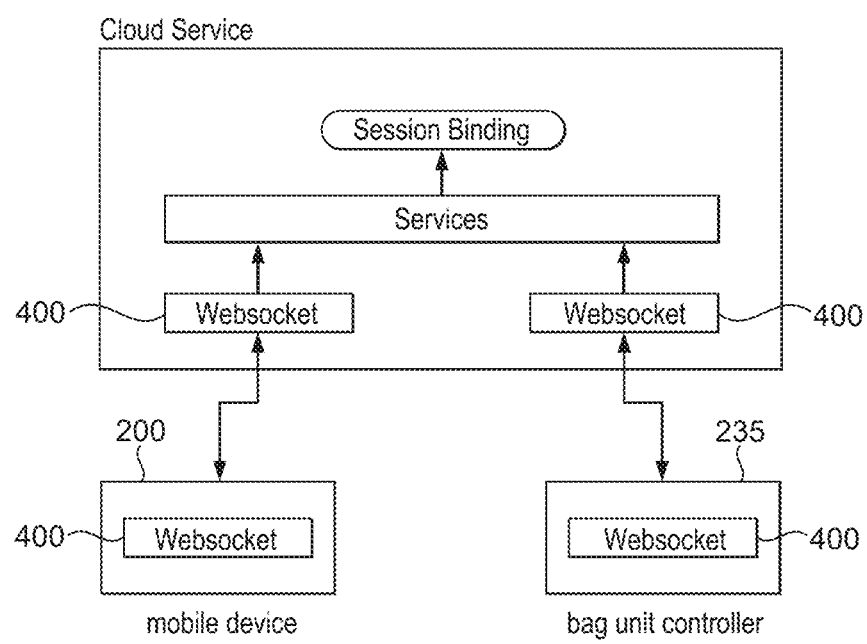
FIG. 4 shows the logical architecture of the system.

FIG. 4 shows the logical architecture of the system. In general, the Cloud Service (220 FIG. 3) acts as a broker between the mobile device 200 and the baggage unit controller. The service exposes a single connection endpoint to the mobile device, mitigates any network related complexities, allows for multiple device over the air protocols, manages bag drop service availability, and creates an abstraction for any controller specific messaging. A Web socket connection 400 is established between the mobile device 200 and the Cloud Service, and between the Cloud Service and the Baggage Unit Controller. The latter connection will be established by the Baggage Unit Controller, and maintained for the duration of the controller's time in service. It is the responsibility of the controller to assure that the connection is up. If the connection is terminated, the controller must re-establish the connection. The cloud service will consider the bag drop unit unavailable if the web socket connection is not active. Although described as a websocket, other asynchronous or bi-synchronous methods may be used.

Similarly, the mobile device 200 is responsible for establishing a connection with the Cloud Service 220, and to maintain the connection for the life of the session. As with the controller, discovery of the service from each mobile device streamlines the process.

The end to end session is mapped via binding the id's of both the mobile device and bag unit controller.

Figure 5:
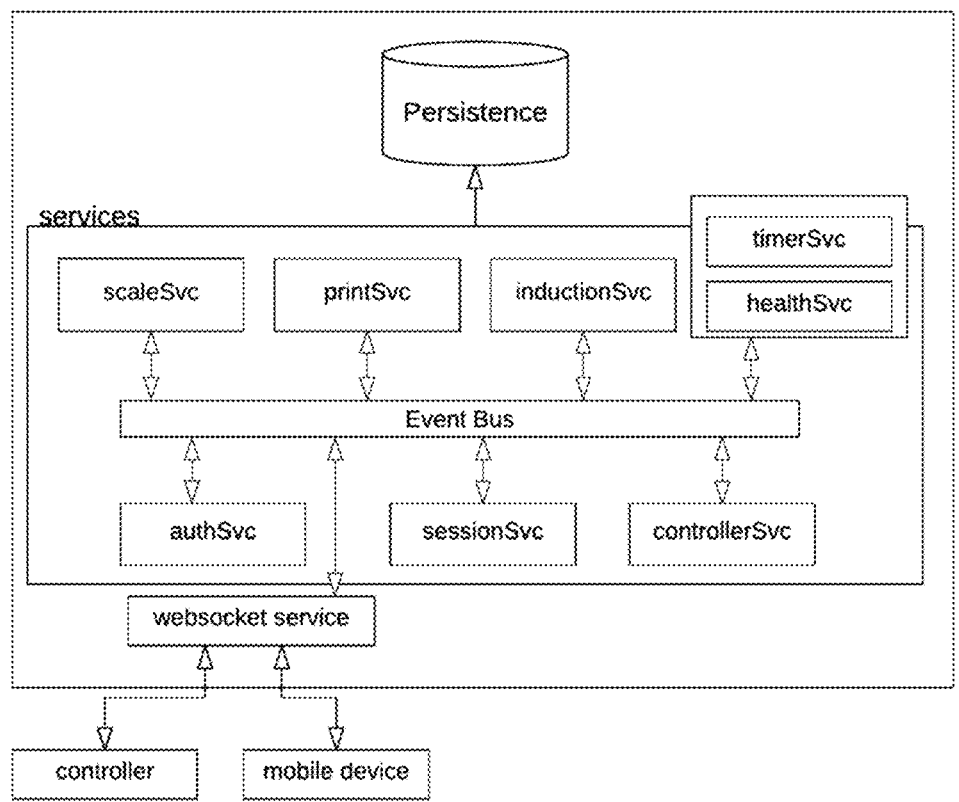
FIG. 5 illustrates the logical architecture of the Cloud service.

The logical architecture of the cloud service 220 is shown in FIG. 5. The Cloud service consists of a set of microservices hosted on a distributed reactive platform. Each service endpoint registers an address by which events, based on operator (op), will be routed across the event bus. The web socket service is the external facing service which directly communicates with controllers and mobile devices.

Figure 6:
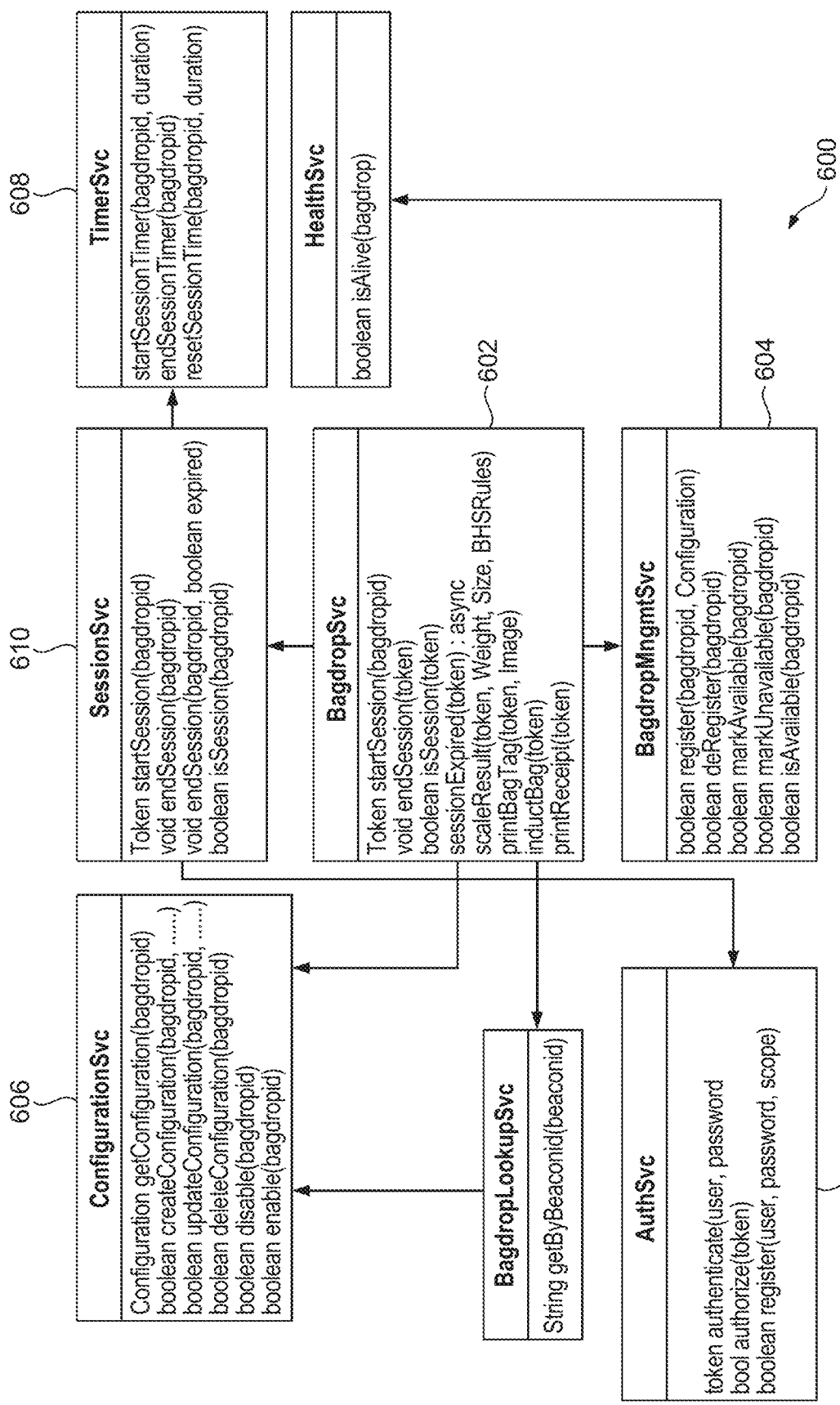
FIG. 6 is a class diagram showing a service model indicating available interfaces.

FIG. 6 is a class diagram 600 that depicts a service model reflecting the interfaces available, and is coarser grained in nature than the service platform model. The services are as follows:

BagDropSvc 602

This service comprises the interfaces used in a session between the mobile device and the controller. Some interfaces may "pass through" to additional services, such as session, however, most if not all basic interfaces will be managed here. These include bag induction, bag tag printing, scale services, etc.

Bag DropMngntSvc 604

This service handles the management of controllers. When a controller is booted for the first time, a registration request is sent. The service will interact with the ConfigurationSvc 606 to validate the request and store the new configuration for the controller. It also handles the availability status of the controller.

TimerSvc 608

A session has a predetermined inactivity period. The TimerSvc manages this, and interacts with the sessionSvc to handle overall session state.

ConfigurationSvc 606

As stated, this service interacts with the BagDropMngmtSvc to register and deregister controllers. In addition, each controller may have unique attributes, which can be uploaded and stored. Controllers may be enabled and disabled via the interface.

SessionSvc 610

This service manages a session between the mobile device and the controller. It interacts with the AuthSvc to authenticate users on start_session and to validate tokens, and with the timerSvc to invalidate a session after a period of inactivity.

AuthSvc 612

This service interface acts as a facade to one or more implementations of Authentication and Authorization. An initial implementation will provide for a local userid/password authentication scheme, and JWT (JSON Web Tokens) for authorization.

FIG. 7 shown the logical architecture of the Bag Unit Controller 235 in FIG. 3. A workstation 702 which may be any suitable computing device hosts the hardware service 704 and bag drop controller service 706. The Workstation is, in a preferred embodiment, configured as a common use terminal, for example running a Windows™ operating system, as discussed above. The bag drop controller service acts as a communication layer between the cloud service and the hardware service via web socket 708 and hardware communication layer 710. It also manages the state of the machine and registers to the cloud service. The hardware service 704 connects to an IO server 710 and other hardware peripherals. Alternatively the hardware service may connect to a Common Use Self-Service module.

The IO Server 710 includes a programmable logic control PLC 712 to control one or more baggage belt setups 714 and to other hardware 716. It is connected either to the airport Baggage Handling System or directly to the hardware.

FIG. 8 shows the architecture of the mobile device application (app) 800. The app has two main components, a software development kit SDK 802 and user written event handlers 804. The mobile device architecture is designed to push as much of the applicable processing into the SDK 802. This makes it easier for the app developer, which is a specific airline or an external vendor to implement the service. Applicable processing includes workflow as well as socket communications between the mobile device and cloud service.

To achieve this, the app developer implements a set of documented event listeners, or handlers 804. These listeners, or observers, are registered to accept callbacks from the SDK, at which time the handler executes logic predefined to achieve a certain result. The handler 804 may also be required to call the SDK 802 with the result, or simply to inform the SDK 802 of its completion. FIG. 8 shows the high level interactions between the UX (User Experience layer) 806, application logic 808, and SDK 802.

Table 1 below is a list of event handlers that an app developer will implement.

TABLE 1

| Operator | Description |
| --- | --- |
| no_session | Called if start_session fails, due e.g. to bag drop unit not available |
| session_ready | Session is ready, app should inform user to place bag on scale. This is also a trigger to fetch airline rules, if not already cached in app. |
| scale_result | Result from scale delivered to handler. Included in result is airport rules. If either airline or airport rules check fails, handler informs passenger as to options. |
| bagtag_printed | Handler is informed that the bag is ready to be inducted. The app may want to communicate with passenger first before calling induct_bag. If bagtag already printed (in which case print_bagtag would not be called), app would call sdk induct_bag directly) |
| bag_inducted | Handler to clean up and end session. |
| end_session | Alternative to bag inducted |

Table 2 a list of method calls to the sdk which are implemented by the app.

TABLE 2

| Method | Description |
| --- | --- |
| start_session | Request to initiate session with bag drop. Most likely called as the result of an external trigger (e.g. beacon, NFC) from a close-by bag drop unit. |
| print_bagtag | The app would have made a call to its DCS to check bag. The successful result (image, pectab, etc) would be included in this call. |
| induct_bag | Request to induct the bag into the BHS system. |
| print_receipt | Request to print bagtag receipt. |
| end_session | Request to end this session. |

FIG. 9 is a process flow diagram showing the end to end interaction between the SDK 802, airline mobile app components, and the UX 806. In the example of FIG. 9, the bag tag has not yet been printed. If the bag tag has already been printed, a different path would be taken to support this.

FIG. 10 shows the end to end interactions between the major system actors, mobile device app, cloud service, and self bag drop unit. The DCS (Departure Control System) interaction with the app is also shown. Similarly to the FIG. 9 example the bag tag has not yet been printed. If the bag tag has already been printed, a different path would be taken.

Security may be achieved by ensuring that all communications, for all sessions, between the mobile device and cloud service, and between the cloud service and bag drop unit controller, are over secure, cryptographic protocols. Secure web socket protocol (WSS) presently preferred. JSON web tokens (JWT) are used to authenticate and authorize transactions across all layers. JWT is a compact, URL-safe means of representing claims between parties by encoding them as JSON objects which can be digitally signed or encrypted.

In the mobile device app, HMAC (Hash-based Message Authentication Code) algorithms are used between the mobile device and cloud service. Each client (e.g. an airline) receives a single user id and password combination. On session_start, these credentials are passed to the cloud service, which validates them. A JWT is generated using a private key. The mobile device is responsible for sending the JWT with each request. A new JWT may be generated at any time by the cloud service. It is the responsibility of the mobile client to save the JWT on each event received from the cloud service, and to pass the latest version back on subsequent requests.

HMAC algorithms are also used between the bag drop unit controller and cloud service. Each Bag drop unit controller is pre-configured with a unique id, username and password. When the module first boots, the controller registers with the cloud service, passing its unique credentials with the registration request. On successful registration, the cloud service response contains a JWT, which will be required in each message from the controller to the cloud service.

As an alternative, RSA public/private key encryption may be used.

The API handles interactions between the Cloud service 220 and the controller 235, between the Cloud service 220 and mobile device 200, and between the Cloud service 220 and both the controller and mobile device (in a proxy mode).

Each API event, or operation is conveyed in a JSON payload over a secure web socket connection (wss), and contains an event operator (op). The type operator type is used to route the message to an appropriate handler.

A session between the mobile app and Bag Drop unit, is initiated during start_session, propagated by use of JsonWebToken, and ended with either an end session call or timeout. The mobile app client is responsible for passing the token with each call made to the cloud service. This may be the responsibility of the SDK, as only it communicates with the cloud service via the web socket connection.

1. Cloud Service—Mobile Device

A basic command is sent in the following format:

```
{
    "token": "<service-supplied token>",
    "op": "<command>",
    "txid": "<generated transaction id>",
    "args"": [{
        "key1": "val1",
        "key2": "val2",
        "key3": "val3"
    }]
}
```

This format is valid for all API calls except start_session, in which the application's user id and password will be sent.

The resulting token returned indicates successful authentication, and an active session with the bag drop unit. Transaction id is optional for the requestor. If a transaction id is received, it is preferred, but not mandatory, to return it in a response payload.

Reply reply is a generic response sent by either the cloud service or mobile device. The message carries information pertaining to a previous request, and (optional) transaction id. It may be used to acknowledge a request with no specific response payload. This API is bi-directional.

Field Description

| Key | Value | required |
|---|---|---|
| op | reply | yes |
| token | Service provided session token | yes |
| txid | Transaction id | no |
| for | {the request api} | yes |
| result | ok or failed | yes |
| reason_code | Reason for failure | cond |

Example

```
{
    "token": "eyJpc3MiOiJ0b3B0YWwuY2....",
    "op": "reply",
    "txid": "<generated transaction id>",
    "args": [{
    "for": "mark_available",
        "result": "ok",
    }]
}
{
    "token": "eyJpc3MiOiJ0b3B0YWwuY2....",
    "op": "reply",
    "txid": "<generated transaction id>",
    "args": [{
    "for": "mark_available",
        "result": "failed",
        "reason_code": "NO_RESPONSE"
    }]
}
```

Reason Codes (tbd)

| Code | Description |
|---|---|
| NO_RESPONSE | The service has not responded within the timeout period |
| NOT_SUPPORTED | Generic response to a request. Examples include print bagtag, print receipt. |

Start_Session start_session requests that a session with the bag drop denoted by id is started with the client. Credentials are passed in the request. Each client of the system will have a unique set of credentials. Credentials are not unique to each app user. This is a one way, asynchronous request. The client will receive either a session_ready or no_session event as the result of this call. The direction is generally from mobile app to cloud service.

Field Description

| Key | Value | required |
|---|---|---|
| op | session_start | yes |
| txid | Transaction id | no |
| uid | The client provided user id | yes |
| pwd | The client provided password | yes |
| bagdrop_id | The id of the bag drop unit as provided during discovery | yes |

Example

```
{
    "op": "start_session",
    "args": [{
        "uid:" "myClientId",
    "pwd": "myClientPwd",
        "bagdrop_id": "ID105211"
    }]
}
```

Session_Ready session_ready is one of two events that result from a start_session request. It notifies the client that the session with the bag drop unit has been started. The response includes capabilities of the bag drop unit, e.g. bag tag and receipt printing is available or not. Direction is generally from cloud service to mobile app.

Field Description

| Key | Value | required |
|---|---|---|
| op | session_ready | yes |
| txid | Returned transaction id | no |
| token | Service provided session token | yes |
| bag drop_id | The id of the bag drop unit we are in session with | yes |
| config | Key value pair of configured capabilities of the bag drop unit. Values TBD. | no |

Exampled

```
{
    "token": "eyJpc3MiOiJ0b3B0YWwuY2....",
    "op": "session_ready",
    "args": [{
    "bagdrop_id": "ID105211"
    "config": [{
        "print_bagtag": true,
        "print_receipt": true
    }],
}]
}
```

No_Session no_session is one of two events that result from a start_session request. It notifies the client that the session with the bag drop unit did not start successfully. A reason code will be attached to the response. Direction is generally from cloud service to mobile app.

Field Description

| Key | Value | required |
|---|---|---|
| op | no_session | yes |
| txid | Transaction id | no |

-continued

| Key | Value | required |
|---|---|---|
| reason_code | Valid reason code (see table) | no |
| bagdrop_id | The bag drop unit id | yes |

Example

```
{
    "op": "no_session",
    "args": [{
        "bagdrop_id": "ID105211",
        "reason_code": "OUT_OF_SERVICE"
    }]
}
```

Reason Codes

| Code | Description |
|---|---|
| OUT_OF_SERVICE | The bag drop unit is out of service. |
| IN_USE | The bag drop unit is being used, there is an existing session. |

End_Session end_session is sent by either party to signify that the sender wishes to end the session. While generally sent from the mobile app, in order for both sides to clean up, it may be sent by the cloud service for a number of reasons. Direction is generally from mobile app to cloud service. May be sent from cloud service.

Field Description

| Key | Value | required |
|---|---|---|
| op | end_session | yes |
| token | Service provided session token | yes |
| txid | Transaction id | no |
| bag drop _id | The id of the bag drop unit we are in session with | yes |
| reason_code | Reason for ending session | no |

Example

```
{
    "token": "eyJpc3MiOiJ0b3B0YWwuY2....",
    "op": "end_session",
    "args": [{
        "bagdrop_id": "ID105211",
        "reason_code": "PROCESS_COMPLETE"
    }]
}
```

Reason Codes

| Code | Description |
|---|---|
| PROCESS_COMPLETE | Either side considers that the check in workflow is complete. |
| USER_REQUESTED | The user (passenger) has requested to stop the process |
| UNIT_ERROR | The bag drop unit has detected some error or malfunction and can no longer continue. |

| Code | Description |
|---|---|
| SESSION_TIMEOUT | The session has timed out |
| BAGGAGE_ERROR | There is some problem with continuing to check this bag(s) in |

Scale_Result scale_result is sent by the cloud service, forwarding from the bag drop unit, to relay the results of the weighing of the bag by the bag drop unit scale. The response includes a set of airport or baggage handling system restrictions on weight/size. Direction is from cloud service to mobile app.

Field Description

| Key | Value | required |
|---|---|---|
| op | scale_result | yes |
| token | Service provided session token | yes |
| txid | Transaction id | no |
| bag drop _id | The id of the bag drop unit we are in session with | yes |
| weight | Weight of bag | yes |
| dimension | Bag dimensions | yes |
| weight_unit | Unit used (K = kilo, P = pounds) | yes |
| dimension_unit | Unit used (I = inches, M = millimeters) | yes |
| bhs_rules | Array of bhs rules | no |
| bhs_rules.weight | Weight restriction | no |
| bhs_rules.dimension | Size restriction | no |
| bhs_rules.weight_unit | Unit used | cond |
| bhs_rules.dimension_unit | Unit used | cond |
| result | An enumerated advisory (see reason codes section) | yes |

Example

```
{
    "token": "eyJpc3MiOiJ0b3B0YWwuY2....",
    "op": "scale_result",
    "args": [{
        "bagdrop_id": "ID105211",
        "weight": 20,
        "dimension": 10,
        "weight_unit": "K",
        "dimension_unit": "I",
        "bhs_rules": [{
            "weight": 50,
            "dimension": 20,
            "weight_unit": "K",
            "dimension_unit": "I"
        }]
        "result": "PASSED"
    }]
}
```

Reason Codes

| Code | Description |
|---|---|
| PASSED | weight/size passed all requirements |
| FAILED_WEIGHT_AIRLINE | failed airline weight restriction |
| FAILED_WEIGHT_BHS | failed BHS weight restriction |
| FAILED_SIZE_AIRLINE | failed airline size restriction |
| FAILED_SIZE_BHS | failed BHS size restriction |
| PLACE_IN_TUB_RETEST | advisory code to place bag in a tub and place on scale |

Print_Bagtag print_bagtag is sent by the mobile device to the cloud service. As the request is delivered to the bag drop unit, it is considered a proxy call. The request contains the image to be printed, e.g. in pectab format. Direction is from mobile app to cloud service.
Field Description

| Key | Value | required |
|---|---|---|
| op | print_bagtag | yes |
| token | Service provided session token | yes |
| txid | Transaction id | no |
| bag drop _id | The id of the bag drop unit we are in session with | yes |
| image | The image to be printed | yes |
| format | The format of the image (e.g. PECTAB) | yes |

Example

```
{
    "token": "eyJpc3MiOiJ0b3B0YWwuY2....",
    "op": "print_bagtag",
    "args": [{
        "bagdrop_id": "ID105211",
        "image": "<image to print>",
        "format": "PECTAB"
    }]
}
```

Formats

| Code | Description |
|---|---|
| PECTAB | Parametric Table |

Induct_Bag induct_bag is sent by the mobile device to the cloud service. As the request is delivered to the bag drop unit, it is considered a proxy call. The request, as implied, is for the bag drop unit to initiate injecting the bag into the baggage handling system. This call may be optional based on configuration. For example, some configurations may call for the bag to be automatically inducted after some certain step, particularly if the bag tag has been pre-printed, and is attached to the bag. Direction is from mobile app to cloud service.
Field Description

| Key | Value | required |
|---|---|---|
| op | induct_bag | yes |
| token | Service provided session token | yes |
| txid | Transaction id | no |
| bag drop _id | The id of the bag drop unit we are in session with | yes |

Example

```
{
    "token": "eyJpc3MiOiJ0b3B0YWwuY2....",
    "op": "induct_bag",
    "args": [{
        "bagdrop_id": "ID105211"
    }]
}
```

Print_Receipt print_receipt is sent by the mobile device to the cloud service. As the request will be delivered to the bag drop unit, it is considered a proxy call. The request contains the image to be printed, e.g. in pectab format.

Direction is from mobile app to cloud service. A reply is to be expected.
Field Description

| Key | Value | required |
|---|---|---|
| op | print_receipt | yes |
| token | Service provided session token | yes |
| txid | Transaction id | no |
| bag drop _id | The id of the bag drop unit we are in session with | yes |
| image | The image to be printed | yes |
| format | The format of the image (e.g. PECTAB) | yes |

Example

```
{
    "token": "eyJpc3MiOiJ0b3B0YWwuY2....",
    "op": "print_receipt",
    "args": [{
        "bagdrop_id": "ID105211",
        "image": "<image to print>",
        "format": "PECTAB"
    }]
}
```

Formats

| Code | Description |
|---|---|
| PECTAB | Parametric Table |

2. Cloud Service—Controller
A basic command is sent in the following format:

```
{
    "token": "<server-supplied token>",
    "op": "<command>",
    "txid": "<generated transaction id>",
    "args": [{
        "key1": "val1",
        "key2": "val2",
        "key3": "val3"
    }]
}
```

This format is valid for all API calls except register, in which the baggage handling unit's unique id, username and password will be sent. Transaction id is optional for the requestor. If a transaction id is received, it is preferred, but not mandatory, to return it in a response payload.
Reply reply is a generic response sent by either the cloud service or controller. The message carries information pertaining to a previous request, and (optional) transaction id. It may be used to acknowledge a request with no specific response payload. This API is bi-directional.
Field Description

| Key | Value | required |
|---|---|---|
| Op | reply | yes |
| Token | Service provided session token | yes |
| Txid | Transaction id | no |

-continued

| Key | Value | required |
|---|---|---|
| For | {the request api} | yes |
| Result | ok or failed | yes |
| reason_code | Reason for failure | cond |

Examples

```
{
    "token": "eyJpc3MiOiJ0b3B0YWwuY2....",
    "op": "reply",
    "txid": "<generated transaction id>",
    "args": [{
        "for": "mark_available",
        "result": "ok",
    }]
}
{
    "token": "eyJpc3MiOiJ0b3B0YWwuY2....",
    "op": "reply",
    "txid": "<generated transaction id>",
    "args": [{
        "for": "mark_available",
        "result": "failed",
        "reason_code": "NO_RESPONSE"
    }]
}
```

Reason Codes

| Code | Description |
|---|---|
| NO_RESPONSE | The service has not responded within the timeout period |

Register register is sent by the bag drop controller (CUTE, CUSS module or other) to the cloud service. This is a one-time message, sent the first time the controller is brought online. The controller receives one of two events as a result of the register request, registered, or registration_failed. Direction is from controller to cloud service.

Field Description

| Key | Value |
|---|---|
| Op | register |
| bag drop _id | The unit's preconfigured id |
| username | The unit's preconfigured username |
| password | The unit's preconfigured password |

Example

```
{
    "op": "register",
    "args": [{
        "bagdrop_id": "ID105211",
        "username": "9e83a024-c374-4c3e-bd4e-ead758282513",
        "password": "bfdfdcb7-4cd2-4b33-ae17-a11c45ae1802"
    }]
}
```

Registered registered is sent by the cloud service to the controller. The message indicates successful registration, and that a session has been started. Direction is from cloud service to controller.

Field Description

| Key | Value |
|---|---|
| op | registered |
| token | Service provided session token |

Example

```
{
    "token": "eyJpc3MiOiJ0b3B0YWwuY2....",
    "op": "registered"
}
```

Registration_Failed registration_failed is sent by the cloud service to the controller. The message indicates that there was an issue in attempting to register the controller. Direction is from cloud service to controller.

Field Description

| Key | Value |
|---|---|
| op | registration_failed |

Example

```
{
    "op": "registration_failed",
    "reason_code": "BAD_CREDENTIALS"
}
```

Reason Codes

| Code | Description |
|---|---|
| UNKOWN_UNIT_ID | The bag drop unit is not found in the database (must be preconfigured in cloud service). |
| BAD_CREDENTIALS | Username and/or password incorrect |

Deregister deregister is sent by the bag drop controller (CUTE, CUSS module or other) to the cloud service. The API request informs the cloud service that the controller has been decommissioned, and to remove its record from the system. Direction is from controller to cloud service.

Field Description

| Key | Value |
|---|---|
| op | deregister |
| token | Service provided session token |
| bag drop _id | The unit's preconfigured id |
| username | The unit's preconfigured username |
| password | The unit's preconfigured password |

Example

```
{
    "token": "eyJpc3MiOiJ0b3B0YWwuY2....",
    "op": "register",
    "args": [{
        "bagdrop_id": "ID105211",
```

-continued

```
        "username": "9e83a024-c374-4c3e-bd4e-ead758282513",
        "password": "bfdfdcb7-4cd2-4b33-ae17-a11c45ae1802"
    }]
}
```

Mark_Available mark_available is sent by the bag drop controller (CUTE, CUSS module or other) to the cloud service. The API request informs the cloud service that the controller is now available to accept sessions. If the controller is already available, the request will be ignored by the cloud service. In all cases, an acknowledgement will be sent back. Direction is from controller to cloud service.

Field Description

| Key | Value |
|---|---|
| op | mark_available |
| token | Service provided session token |

Example

```
{
    "token": "eyJpc3MiOiJ0b3B0YWwuY2....",
    "op": "mark_available",
}
```

Mark_Unavailable mark_available is sent by the bag drop controller (CUTE, CUSS module or other) to the cloud service. The API request informs the cloud service that the controller is unavailable to accept sessions. If the controller is already marked unavailable, the request will be ignored by the cloud service. In all cases, an acknowledgement will be sent back. Direction is from controller to cloud service.

Field Description

| Key | Value |
|---|---|
| Op | mark_unavailable |
| Token | Service provided session token |

Example

```
{
    "token": "eyJpc3MiOiJ0b3B0YWwuY2....",
    "op": "mark_unavailable",
    "args": [{
        "reason_code": "MAINTENANCE"
    }]
}
```

Reason Codes

| Code | Description |
|---|---|
| MAINTENANCE | The controller is taken offline for maintenance |
| MODE_CHANGE | The bag drop unit is changing modes e.g. switching to manual |

Scale_Result scale_result is sent by the bag drop unit, to the cloud service. The response includes a set of airport or baggage handling system restrictions on weight/size. Direction is from controller to cloud service.

Field Description

| Key | Value |
|---|---|
| op | scale_result |
| token | Service provided session token |
| weight | Weight of bag |
| dimension | Bag dimensions |
| weight_unit | Unit used (K = kilo, P = pounds) |
| dimension_unit | Unit used (I = inches, M = millimeters) |
| bhs_rules | Array of bhs rules |
| bhs_rules.weight | Weight restriction |
| bhs_rules.dimension | Size restriction |
| bhs_rules.weight_unit | Unit used |
| bhs_rules.dimension_unit | Unit used |
| result | An enumerated advisory (see reason codes section) |

Example

```
{
    "token": "eyJpc3MiOiJ0b3B0YWwuY2....",
    "op": "scale_result",
    "args": [{
        "weight": 20,
        "dimension": 10,
        "weight_unit": "K",
        "dimension_unit": "I",
        "bhs_rules": [{
            "weight": 50,
            "dimension": 20,
            "weight_unit": "K",
            "dimension_unit": "I"
        }],
        "result": "PASSED"
    }]
}
```

Reason Codes

| Code | Description |
|---|---|
| PASSED | weight/size passed all requirements |
| FAILED_WEIGHT_AIRLINE | failed airline weight restriction |
| FAILED_WEIGHT_BHS | failed BHS weight restriction |
| FAILED_SIZE_AIRLINE | failed airline size restriction |
| FAILED_SIZE_BHS | failed BHS size restriction |
| PLACE_IN_TUB_RETEST | advisory code to place bag in a tub and place on scale |

Print_Bagtag print_bagtag is sent by the cloud service to the controller. As the request originated from the mobile device, it is considered a proxy call. The request contains the image to be printed, e.g. in pectab format. Direction is from cloud service to cloud controller. A response from the controller is expected.

Field Description

| Key | Value | required |
|---|---|---|
| op | print_bagtag | yes |
| token | Service provided session token | yes |
| Transaction id | Transaction id | no |
| image | The image to be printed | yes |
| format | The format of the image (e.g. PECTAB) | yes |

Example

```
{
   "token": "eyJpc3MiOiJ0b3B0YWwuY2....",
   "op": "print_bagtag",
   "args": [{
      "bagdrop_id": "ID105211",
      "image": "<image to print>",
      "format": "PECTAB"
   }]
}
```

Formats

| Code | Description |
| --- | --- |
| PECTAB | Parametric Table |

Induct_Bag induct_bag is sent by the cloud service to the controller. As the request originated at the mobile device, it is considered a proxy call. The request, as implied, is for the bag drop unit to initiate injecting the bag into the baggage handling system. This call may be considered optional based on configuration. For example, some configurations may call for the bag to be automatically inducted after some certain step, particularly if the bag tag has been pre-printed, and is attached to the bag. Direction is from cloud service to controller. A reply is expected.

Field Description

| Key | Value | required |
| --- | --- | --- |
| op | induct_bag | yes |
| token | Service provided session token | yes |
| txid | Transaction id | no |

Example

```
{
   "token": "eyJpc3MiOiJ0b3B0YWwuY2....",
   "op": "induct_bag"
}
```

Print_Receipt print_receipt is sent by the cloud service to the controller. As the request originates from the mobile device, it is considered a proxy call. The request contains the image to be printed, e.g. in pectab format. Direction is from mobile app to cloud service. A reply is expected.

Field Description

| Key | Value | required |
| --- | --- | --- |
| op | print_receipt | yes |
| token | Service provided session token | yes |
| txid | Transaction id | no |
| image | The image to be printed | yes |
| format | The format of the image (e.g. PECTAB) | yes |

Example

```
{
   "token": "eyJpc3MiOiJ0b3B0YWwuY2....",
   "op": "print_receipt",
   "args": [{
      "image": "<image to print>",
      "format": "PECTAB"
   }]
}
```

Formats

| Code | Description |
| --- | --- |
| PECTAB | Parametric Table |

As described, the system comprises a front end application which is either a unique application or a module on an airline/airport website. This is the interface through which airlines and/or airports present the bag drop service to their passengers. A back-end software engine hosts the logic for the self-bag drop process and drives the process. An API enabled communication between the App, the backend software engine and the baggage handling system hardware and self-bag drop peripherals such as the printer and weigher.

Other speedy peripherals may include automated readers and baggage assessment devices for example the BHS hardware may comprise new or existing conveyor belts and weighing scales.

Embodiments of the invention may also be used where printed boarding passes are required for use by the passenger instead of mobile boarding passes and with any type of bag tag including temporary and permanent bag tags, tag-less baggage handling systems and self-printed bag tags.

Embodiments of the invention have many advantages. The interaction between the passenger and the self-service location is made more simple for the passenger and enables operators to reduce overheads such as the staffing of traditional check-in and other facilities while requiring only relatively small modifications to existing check-in systems and other systems such as passport gates etc. From the perspective of the passenger, it provides convenience and time savings so enhancing the passenger's experience of the airport.

Although described in respect of a bag drop system, embodiments of the invention may be used in conjunction with other airport self-service functions such as e-gates, providing electronic passport and/or boarding pass checks, final boarding checks and kiosks for checking in and/or generation and printing of bag tags. In one embodiment the passenger's mobile device connects to a baggage handling system on arrival at an airport and the passenger is directed to the correct carousel and their baggage is also directed to that carousel.

Embodiments of the invention may be used with similar services at other ports, railways of mass transit locations as well as at venues, sports grounds etc. where individuals interact with services such as ticket checks.

Embodiments of the invention may also be advantageous for passengers with certain disabilities. For example by using the audio capabilities of a smart device a blind or partially sighted passenger's experience of the bag drop, passport control and other airport functions can be greatly improved. Embodiments of the invention also enable the integration of passenger information on the smart device with payment services that an airline or airport may already provide via existing mobile applications.

What is claimed is:

1. A method of facilitating interaction between a ticket holder and a self-service function related to a ticket, comprising the steps of:
   at a location proximate a self-service function related to the ticket, scanning, using a mobile device, a machine-readable code associated with the self-service function to retrieve an identifier of the self-service function and to activate an application or a web session on the mobile device, the application or web session being related to the self-service function and the mobile device having stored thereon information relating to the ticket;
   establishing a first connection session between the mobile device and a cloud broker service;
   establishing a second connection session between the self-service function and the cloud broker service;
   generating, via the cloud broker service, an end to end session via the first connection session and the second connection session by mapping an identifier of the mobile device with the identifier of the self-service function; and
   communicating from the self-service function to the application of the mobile device through the cloud broker service, information about an interaction between the ticket holder and the self-service function including directional information, the cloud broker service being between the mobile device and the self-service function via the end to end session.

2. The method according to claim 1, wherein the machine-readable code is a one-dimensional barcode or a two-dimensional barcode.

3. The method according to claim 1, wherein the machine-readable code is a QR code.

4. The method according to claim 1, wherein the ticket relates to a passenger journey and includes passenger and journey identification.

5. The method according to claim 1, wherein information relating to the ticket comprises a boarding pass.

6. The method according to claim 1, wherein the application queries information relating to the ticket stored on the mobile device and communicates the information relating to the ticket to a remote server.

7. The method according to claim 6, wherein the remote server, in response to receipt of the information relating to the ticket provides information relating to the self-service function to the application for presentation to a user of the mobile device.

8. The method according to claim 1, wherein the information relating to the ticket comprises a boarding pass, comprising communicating passenger information in the boarding pass to a departure control system.

9. The method according to claim 1, wherein the information about the interaction between the ticket holder and the self-service function including the directional information is securely communicated via a cryptographic protocol.

10. A system for facilitating interaction between a ticket holder and a self-service function related to a ticket, comprising:
    a self-service function; and
    a mobile device,
    the system being configured to perform the steps of:
       at a location proximate the self-service function related to the ticket, scanning, using the mobile device, a machine-readable code associated with the self-service function to retrieve an identifier of the self-service function and to activate an application or a web session on the mobile device, the application or web session being related to the self-service function and the mobile device having stored thereon information relating to the ticket;
       establishing a first connection session between the mobile device and a cloud broker service;
       establishing a second connection session between the self-service function and the cloud broker service;
       generating, via the cloud broker service, an end to end session via the first connection session and the second connection session by mapping an identifier of the mobile device with the identifier of the self-service function; and
       communicating from the self-service function to the application of the mobile device through the cloud broker service, information about an interaction between the ticket holder and the self-service function including directional information, the cloud broker service being between the mobile device and the self-service function via the end to end session.

11. The system according to claim 10, wherein the machine-readable code is a one-dimensional barcode or a two-dimensional barcode.

12. The system according to claim 10, wherein the machine-readable code is a QR code.

13. The system according to claim 10, wherein the ticket relates to a passenger journey and includes passenger and journey identification.

14. The system according to claim 10, wherein information relating to the ticket comprises a boarding pass.

15. The system according to claim 10, wherein the application queries information relating to the ticket stored on the mobile device and communicates the information relating to the ticket to a remote server.

16. The system according to claim 15, wherein the remote server, in response to receipt of the information relating to the ticket provides information relating to the self-service function to the application for presentation to a user of the mobile device.

17. The system according to claim 10, wherein the information relating to the ticket comprises a boarding pass, comprising communicating passenger information in the boarding pass to a departure control system.

18. The system according to claim 10, wherein the information about the interaction between the ticket holder and the self-service function including the directional information is securely communicated via a cryptographic protocol.

* * * * *